Figure 1:
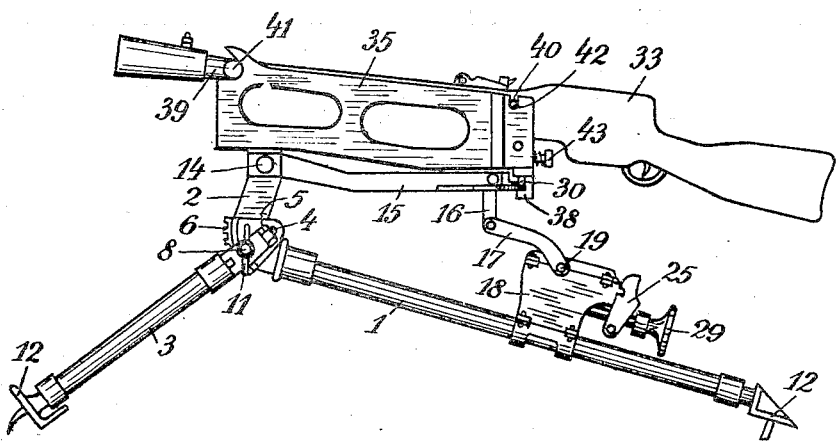

Aug. 3, 1926.

W. C. L. HAUBROE 1,594,365

TRIPOD FOR MACHINE GUNS

Filed Sept. 3, 1924    2 Sheets-Sheet 1

INVENTOR.
WERNER CHRISTIAN LASSEN HAUBROE by Francis E. Bayor
ATTORNEY

Aug. 3, 1926.  W. C. L. HAUBROE  1,594,365
TRIPOD FOR MACHINE GUNS
Filed Sept. 3, 1924  2 Sheets-Sheet 2
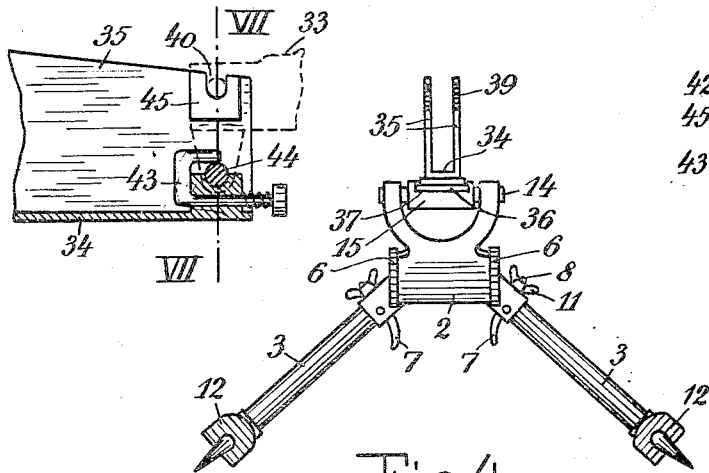
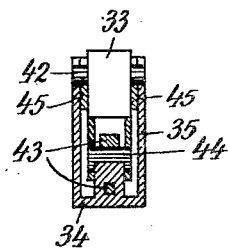
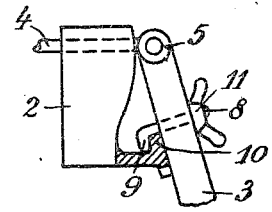
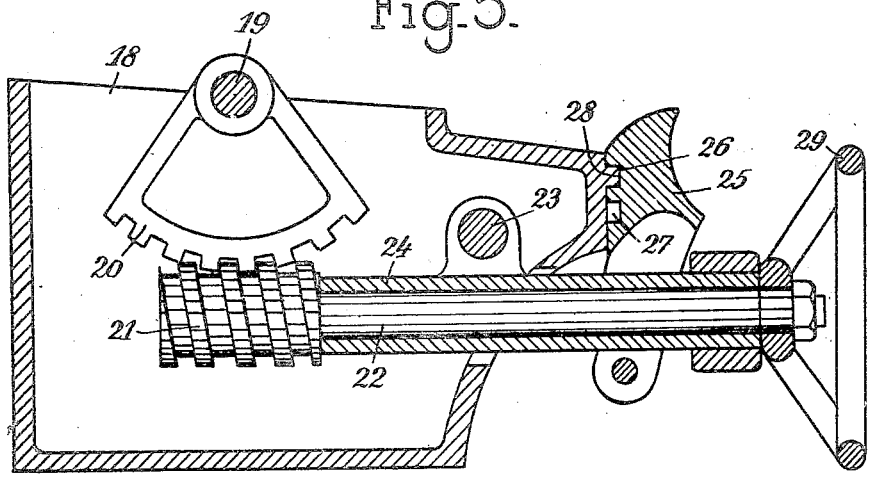
INVENTOR
WERNER CHRISTIAN LASSEN HAUBROE
BY Francis C. Bayer
ATTORNEY Patented Aug. 3, 1926.

1,594,365

UNITED STATES PATENT OFFICE.

WERNER CHRISTIAN LASSEN HAUBROE, OF COPENHAGEN, DENMARK.

TRIPOD FOR MACHINE GUNS.

Application filed September 3, 1924, Serial No. 735,544, and in France October 22, 1923.

The present invention relates to improvements in tripods for machine guns. The invention has for its object to provide partly a support of the machine gun at two points, partly a quick and convenient attachment of the machine gun on the tripod and, partly, a quick removal of the machine gun from the tripod. According to the invention these advantages are attained by the tripod being fitted with a frame adapted to support the machine gun, the said frame being fitted at front with upwardly open bearings for trunnions on the gun, and at rear a spring hook adapted to hold the gun in position on the frame, so that the gun may simply be placed with its trunnions fitting into the recesses, and may be lifted up from the latter, when the spring hook has been released.

The supporting frame proper may be used in connection with a gun carriage of any suitable construction, but is principally designed for use in connection with the tripod described in the following and shown on the drawing.

On the drawing—

Figure 2:
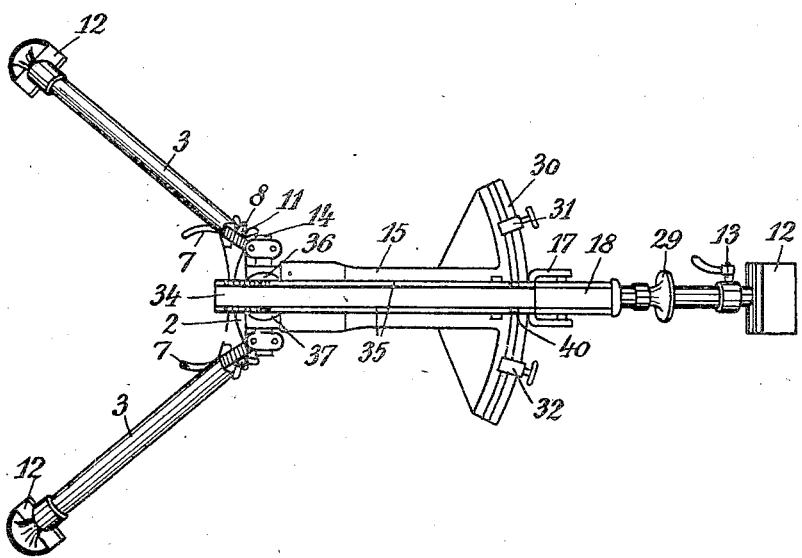

Fig. 1 shows the tripod with a machine gun in side elevation,

Fig. 2 the tripod, without the machine gun, in top view,

Fig. 3 the same in front view,

Figs. 4 to 7 some details, on a larger scale as far as Figs. 5 and 6 are concerned.

The tripod consists of a rearwardly directed leg 1 in firm connection with a supporting yoke 2 in which a bolt 4 is journalled. To either end of this bolt one of the two forwardly directed legs 3 is connected by means of a hinge 5. On either side of the yoke 2 there is provided a toothed sector 6 in engagement with a pawl 7 on either of the legs 3, so that these legs may be adjusted more or less obliquely. In order to secure the legs 3 in the position in which they are adjusted there is provided on each leg a hook bolt 8, see especially Fig. 4, which passes through the leg, and the hook 9 of which takes hold of the rear face of a rail 10 on the yoke 2, so that the leg will be pressed firmly against the rail, when the nut 11 of the hook bolt is tightened. The legs 1 and 3 are fitted each at its free end with a shoe 12 adapted to be pressed into the ground. The leg 1 is extensible, and the adjustment of length is maintained by means of a clamping ring or the like 13, Fig. 2.

In the top portion of the yoke 2 a bolt 14 is journalled, and about the said bolt the front end of a frame carrier 15 is pivoted. The rear end of the said frame carrier supports a pivoted link member 16, the downwardly facing end of which is pivotally connected to a fork 17, the prongs of which are attached each to one end of a shaft 19 journalled in a casing 18. This casing is attached to the leg 1 of the tripod. To the shaft 19 there is attached a worm-wheel sector 20, Fig. 5, which is engaged by a worm 21 on a shaft 22, and the latter is journalled in a tube 24 adapted to swing about a bolt 23 disposed transversely in the casing 18 in such a manner that the worm 21 is withdrawn from engagement with the worm-wheel sector, when the rear end of the shaft projecting out from the casing is raised. The worm is maintained in engagement with the sector by means of a hook 25 fitted with two notches 26 and 27. On the rearwardly facing wall of the casing 18 a projecting tooth 28 is provided. When the upper notch 26 of the hook engages this tooth, the worm 21 will be engaging the sector 20, but it will be out of engagement with the sector when the lower notch 27 of the hook engages the tooth 28. The hook 25 is pivotally connected to the tube 24. To the rear end of the shaft 22 a hand wheel 29 is attached. When the worm 21 is turned by means of this hand wheel, then the sector 20 is turned and, thereby, the shaft 19, whereby the fork 17 is swung up or down. This motion is transmitted by means of the link 16 to the carrier frame 15, the rear end of which is thereby raised or lowered. When the worm 21 is withdrawn from connection with the sector 20, the fork 17 and the link 16 may be folded together.

The frame carrier 15 ends at the rear in a curved rail 30 fitted with two adjustable stops 31 and 32.

The frame adapted to hold the machine gun 33 consists of a bottom plate 34 and two vertical side plates 35. The bottom plate is fitted, at front, on its bottom side, with a circular disc 36, Figs. 2 and 3, which fits into a recess 37 provided at front in the upper face of the frame carrier 15, so that the frame may be swung while sliding on the rail 30. The bottom plate 34 is fitted, at its rear end, with a hook 38 fitting about the rail 30 on the frame carrier 15 and adapted to slide along the said rail between the stops 31 and 32, which serve thus to limit the rotation of the frame in either direction.

In the side plates 35 of the frame there are provided, at front, obliquely upward and forward facing notches 39 for trunnions 41 on the gun. The bottom plate is fitted, at top towards the rear, with a spring actuated hook 43 adapted to engage a transverse pin 44 provided on the gun. The latter is placed in position in the frame by the two foremost pins 41 being inserted into the notches 39 in the frame, whereafter the gun is turned downward, until the transverse pin 44 is caught by the hook 43. In the upper part of the side pieces of the frame notches 42 are provided at the rear for pins 40 provided on the gun, the said pins being frequently provided on guns of this kind in order to facilitate their attachment on other supports. Opposite the notches 42 the side pieces are fitted with reinforcements 45 serving to prevent the gun from sliding sideways in the frame. When the gun is to be removed, for instance when it has to be replaced by another one, or has to be used outside of the tripod, or has to be transported from one place to another one, then the hook 43 is released, and the front trunnions 41 are lifted forward and out from the notches 39. By this arrangement it becomes practicable to avoid the release of bolts or other complicated fastening devices that are necessary in case of other known supports for machine guns and waste much time.

Having thus described my invention, what I claim is:—

The combination with a machine gun, of a carrier therefor comprising an adjustable tripod, an adjustable gun-receiving member pivotally carried on said tripod, said member having a bottom wall and a pair of side walls, said side walls being provided near the front ends thereof with obliquely directed bearing openings and near the rear ends with vertically directed bearing openings, trunnions carried by the gun and adapted to be seated in said openings, a slidable spring-pressed hook carried by said gun-receiving member, means carried by the gun and adapted to be engaged by said hook when said trunnions are seated in their respective openings thereby to lock the gun against displacement, and means for operating said hook against the tension of its spring thereby to release the gun.

In testimony whereof I have signed my name to this specification.

WERNER CHRISTIAN LASSEN HAUBROE.